United States Patent Office 3,212,910
Patented Oct. 19, 1965

3,212,910
STABILIZED COMPOSITIONS OF CYANOETHYL SUCROSE
George P. Touey and John E. Kiefer, Kingsport, Tenn., assignors to Eastman Kodak Company, Rochester, N.Y., a corporation of New Jersey
No Drawing. Filed Feb. 20, 1962, Ser. No. 174,405
13 Claims. (Cl. 106—162)

This invention relates to a composition which has a high dielectric constant and which is stable to heat composed of cyanoethyl sucrose containing 5–7.8 cyanoethyl groups per sucrose molecule and an antioxidant stabilizer.

Various materials have been considered as electrical insulating materials taking into account their dielectric constant, resistivity, dissipation factor and volatility.

Cyanoethylated sucrose containing 5–7.8 cyanoethyl groups per sucrose molecule have been described and claimed in Touey and Davis application Serial No. 805,730, now Patent No. 3,068,220. This material has high resistivity, high dielectric constant, low dissipation factor and low volatility which renders it useful for electrical insulation purposes for many situations. However, cyanoethyl sucrose is prone to decompose when subjected to elevated temperatures under atmospheric conditions. For instance, cyanoethyl sucrose when heated in the air at 100° C. for 24 hours discolors and loses its electrical resistivity. At still higher temperatures the decomposition is more rapid.

One object of our invention is to provide stable compositions of cyanoethyl sucroses containing 5–7.8 cyanoethyl groups per sucrose molecule comprising mixtures of that cyanoethyl sucrose and antioxidant stabilizers. Other objects of our invention will appear herein.

We have found that when antioxidant-type stabilizers are mixed with cyanoethyl sucrose as described, compositions are obtained which are capable of withstanding elevated temperatures for substantial periods of time without any substantial discoloration or loss of electrical resistivity as compared with cyanoethyl sucrose per se. It has been found that an amount of stabilizer of at least 0.001% and desirably up to 2% imparts stability to the cyanoethyl sucrose so that it retains its good electrical properties under adverse conditions. Although amounts of stabilizer greater than 2% are effective, no additional advantage was observed over the use of up to 2% of the stabilizer. Normally a proportion within the range of 0.05–1% is preferred to stabilize the cyanoethyl sucrose.

Various types of stabilizer have been found to be useful in preparing compositions in accordance with the invention. For instance, the stabilizers may be of the phenolic type and as for examples of stabilizers of that type which give good stabilizing effects may be mentioned 4,4′-thiobis(6-tert.-butyl-m-cresol), 2,2′-methylenebis[6-(1-methylcyclohexyl)]-p-cresol and 2,6-didodecyl-p-cresol. Some amine-type stabilizers which are useful in compositions with cyanoethyl sucrose to give good stability are dinaphthyl-p-phenylenediamine, N,N′-diphenyl-p-phenylenediamine and N-dodecyl-p-aminophenol, the latter being both phenolic and an amine. Another type of compound which has shown itself to be useful for stabilizing purposes in compositions in accordance with our invention are esters of thiodipropionic acid and a higher alcohol (8–18 carbon) as for example dilauryl 3,3′-thiodipropionate. Antioxidants which have been regarded as useful for antioxidant purposes in motor fuel appear to have good stabilizing characteristics when mixed with cyanoethyl sucrose to form compositions in accordance with the invention.

The following examples illustrate our invention:

*Example 1*

12 samples were prepared containing 100 parts of cyanoethyl sucrose with an average of 7.3 cyanoethyl groups per sucrose molecule. Each sample was put into a widemouth bottle and to each bottle except one (the control) and antioxidant stabilizer was added. The proportions and the stabilizer employed are specified in the following table. The stabilizers were mixed in at 150° C. thereby dissolving or dispersing in the cyanoethyl sucrose to form compositions in accordance with the invention. The bottles were placed in an oven and maintained at 100° C. The samples were examined after 1 hour and after 9 hours. The amount of stabilizer and the appearance of the samples are recorded in the following table:

| Stabilizer | Amount (Parts) | Appearance 1 Hr. | Appearance 9 Hrs. |
|---|---|---|---|
| 2,2′-Methylenebis[6-(1-methyl-cyclohexyl)]-p-cresol | 0.1 | No change | No change. |
| Dinaphthyl-p-phenylenediamine | 0.1 | do | Do. |
| 2,6-didodecyl-p-cresol | 0.1 | do | Do. |
| 4,4′-thiobis(6-tert-butyl-m-cresol) | 0.01 | do | Pale yellow. |
| 4,4′-thiobis(6-tert-butyl-m-cresol) | 0.1 | do | Yellow. |
| 4,4′-thiobis(6-tert-butyl-m-cresol) | 1.0 | do | No change. |
| Dilauryl 3,3′-thiodipropionate | 0.1 | do | Do. |
| Hydroquinone | 0.1 | do | Yellow. |
| None—control |  | Yellow | Brown. |
| N-cyclohexyl-p-aminophenol | 0.1 | No change | No change. |
| Diphenylamine | 0.1 | do | Do. |
| Di-Beta-hydroxyethyl ether of hydroquinone | 0.1 | do | Pale yellow. |

*Example 2*

100 parts of cyanoethyl sucrose containing an average of 7.5 cyanoethyl groups per sucrose molecule were mixed with 0.1 part of 4,4′-thiobis(6-tert-butyl-m-cresol). The mixture was mixed at 100° C. until the stabilizer had dissolved. The color and electrical resistivity of the sample containing the stabilizer and of the sample which did not contain the stabilizer were recorded. Both samples were placed in an oven at 100° C. and color resistivity was observed, the resistivity measurements having been made at 50° C. The results were shown in the following table:

| Time at 100° C. | Stabilized [1] | Color | Resistivity |
|---|---|---|---|
| At start | − | Colorless | $1.1 \times 10^{10}$ |
| At start | + | Colorless | $1.1 \times 10^{10}$ |
| 24 hr | − | Yellow | $4.2 \times 10^{9}$ |
| 24 hr | + | Colorless | $1.1 \times 10^{10}$ |
| 120 hr | − | Orange | $7.9 \times 10^{3}$ |
| 120 hr | + | Colorless | $9.9 \times 10^{9}$ |
| 240 hr | − | Brown | $3.4 \times 10^{7}$ |
| 240 hr | + | Pale yellow | $7.6 \times 10^{9}$ |

[1] The symbol (−) refresents the unstabilized sample and the symbol (+) represents the stabilized sample.

The compositions of our invention are useful for electrical insulation particularly mixed with supporting materials whereby a layer of the insulating material can be wrapped around or otherwise conveniently applied to an electrical conductor. For instance paper or cloth may be coated or saturated with a composition in accordance with the invention forming a material of value for electrical insulation purposes.

We claim:

1. A composition of matter useful for electrical insulation purposes comprising cyanoethyl sucrose, in which at least 5 hydroxyls of sucrose have had their hydrogens replaced by cyanoethyl groups, containing at least 0.001% of an antioxidant stabilizer.

2. A composition of matter useful for electrical insulation purposes comprising cyanoethyl sucrose, in which at least 5 hydroxyls of the sucrose have had their hydrogens replaced by cyanoethyl groups, containing 0.05–1% of an antioxidant stabilizer.

3. A composition of matter useful for electrical insulation purposes comprising cyanoethyl sucrose, in which at least 5 hydroxyls of the sucrose have had their hydrogens replaced by cyanoethyl groups, containing at least 0.001% of a phenolic antioxidant stabilizer.

4. A composition of matter useful for electrical insulation purposes comprising cyanoethyl sucrose, in which at least 5 hydroxyls of the sucrose have had their hydrogens replaced by cyanoethyl groups, containing at least 0.001% of an amine antioxidant stabilizer.

5. A composition of matter useful for electrical insulation purposes comprising cyanoethyl sucrose in which at least 5 hydroxyls of the sucrose have had their hydrogens replaced by cyanoethyl groups containing at least 0.001% of a thiobispropionic acid ester antioxidant stabilizer.

6. A composition of matter useful for electrical insulation purposes comprising cyanoethyl sucrose in which at least 5 hydroxyls of the sucrose have had their hydrogens replaced by cyanoethyl groups containing at least 0.001% of 4,4′-thiobis(6-tert-butyl-m-cresol).

7. A composition of matter useful for electrical insulation purposes comprising cyanoethyl sucrose, in which at least 5 hydroxyls of the sucrose have had their hydrogens replaced by cyanoethyl groups, containing at least 0.001% of hydroquinone.

8. A composition of matter useful for electrical insulation purposes comprising cyanoethyl sucrose, in which at least 5 hydroxyls of the sucrose have had their hydrogens replaced by cyanoethyl groups, containing at least 0.001% of dinaphthyl-p-phenylenediamine.

9. A composition of matter useful for electrical insulation purposes comprising cyanoethyl sucrose, in which at least 5 hydroxyls of the sucrose have had their hydrogens replaced by cyanoethyl groups, containing at least 0.001% of 2,6-didodecyl-p-cresol.

10. A composition of matter useful for electrical insulation purposes comprising cyanoethyl sucrose, in which at least 5 hydroxyls of the sucrose have had their hydrogens replaced by cyanoethyl groups, containing at least 0.001% of N-cyclohexyl-p-aminophenol.

11. A composition of matter useful for electrical insulation purposes comprising cyanoethyl sucrose, in which at least 5 hydroxyls of the sucrose have had their hydrogens replaced by cyanoethyl groups, containing at least 0.001% of diphenylamine.

12. Fabric saturated with a composition comprising cyanoethyl sucrose, in which at least 5 hydroxyls of the sucrose have had their hydrogens replaced by cyanoethyl groups and at least 0.001%, based on the cyanoethyl sucrose, of an antioxidant stabilizer.

13. Paper saturated with a composition comprising cyanoethyl sucrose in which 5 hydroxyls of the sucrose have had their hydrogens replaced by cyanoethyl groups and at least 0.001%, based on the cyanoethyl sucrose, of an antioxidant stabilizer.

References Cited by the Examiner

UNITED STATES PATENTS

| 3,029,257 | 4/62 | Campbell | 252—404 |
|---|---|---|---|
| 3,068,220 | 12/62 | Touey and Davis | 260—209 |

OTHER REFERENCES

Moreau et al.: Autoxidation and Antioxygenic Action Compt. rend., vol. 183, pp. 408–412, 1926.

Rosenwald et al.: Ind. and Eng. Chem., vol. 42, No. 1, pp. 162–165.

ALEXANDER H. BRODMERKEL, *Primary Examiner.*

MORRIS LIEBMAN, *Examiner.*